United States Patent
Burton

(10) Patent No.: US 6,538,835 B1
(45) Date of Patent: Mar. 25, 2003

(54) POSITION SIGNAL DISTORTION COMPENSATION DURING A DISC DRIVE SEEK

(75) Inventor: Matthew C. Burton, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/435,319

(22) Filed: Nov. 4, 1999

Related U.S. Application Data

(60) Provisional application No. 60/121,068, filed on Feb. 22, 1999.

(51) Int. Cl.$^7$ .................. G11B 15/12; G11B 21/10
(52) U.S. Cl. .................. 360/63; 360/61; 360/78.04; 360/78.14; 360/53; 318/560
(58) Field of Search .................. 360/63, 78.04, 360/78.14, 53, 61, 77.08, 31, 25; 318/560, 561; G11B 15/12, 21/10, 5/596

(56) References Cited

U.S. PATENT DOCUMENTS

| 4,807,063 | A |   | 2/1989  | Moteki              |          |
|-----------|---|---|---------|---------------------|----------|
| 4,809,120 | A |   | 2/1989  | Ozawa               |          |
| 4,833,551 | A |   | 5/1989  | Song                |          |
| 4,896,228 | A |   | 1/1990  | Amakasu et al.      |          |
| 4,924,160 | A |   | 5/1990  | Tung                |          |
| 4,974,109 | A | * | 11/1990 | Hoshimi et al.      | 360/77.11 |
| 5,132,854 | A |   | 7/1992  | Tsuyoshi et al.     |          |
| 5,307,218 | A |   | 4/1994  | Kitamura et al.     |          |
| 5,321,564 | A |   | 6/1994  | Takahashi et al.    |          |
| 5,477,042 | A |   | 12/1995 | Wang                |          |
| 5,796,546 | A | * | 8/1998  | Sasamoto et al.     | 360/78.04 |
| 5,798,883 | A | * | 8/1998  | Kim                 | 360/31   |
| 5,870,243 | A | * | 2/1999  | Ukani et al.        | 360/77.08 |
| 6,031,683 | A | * | 2/2000  | Iverson et al.      | 360/78.04 |
| 6,130,791 | A | * | 10/2000 | Muto                | 360/46   |
| 6,181,500 | B1 | * | 1/2001 | Serrano et al.      | 360/53   |
| 6,347,019 | B1 | * | 2/2002 | Gregg               | 360/78.04 |

FOREIGN PATENT DOCUMENTS

| EP | 0797186 A2 | * | 9/1997 | ............ G11B/5/12 |
| JP | 63167488 A | * | 7/1988 | ............ G11B/21/10 |

* cited by examiner

*Primary Examiner*—Regina N. Holder
*Assistant Examiner*—Dan I. Davidson
(74) *Attorney, Agent, or Firm*—Fellers, Snider, et al.

(57) ABSTRACT

Apparatus and method for compensating for position signal distortion during a disc drive seek. A disc drive has first and second data recording surfaces on which tracks are defined, a moveable actuator which supports first and second magneto-resistive heads, and a servo circuit which applies current to an actuator motor to position the heads. During a seek in which the first head is moved from an initial track to a first destination track, upon loss of transduced servo data from the first data recording surface indicative of radial position of the head, the servo circuit switches from the first head to the second head and applies current to the actuator motor to move the second head to a known radial position with respect to the first destination track while transducing servo data from the second data recording surface. The servo circuit subsequently switches back to the first head to position the first head over the first destination track.

13 Claims, 3 Drawing Sheets

POSITION SIGNAL DISTORTION COMPENSATION DURING A DISC DRIVE SEEK

RELATED APPLICATIONS

This application claims priority to Provisional Application No. 60/121,068 filed Feb. 22, 1999.

FIELD OF THE INVENTION

This invention relates generally to the field of disc drive storage devices, and more particularly, but not by way of limitation, to improvements in the recovery of seek operations in disc drives having magneto-resistive (MR) heads.

BACKGROUND OF THE INVENTION

Disc drives are commonly used as the primary data storage and retrieval devices in modern computer systems. In a typical disc drive, user data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo data written to the surfaces of the discs during manufacturing. Tracks of equal radial position on adjacent disc recording surfaces are referred to as cylinders.

The servo system carries out two primary operations: seeking and track following. During track following, the selected head is maintained over a selected track on the corresponding disc. To this end, the servo system uses the servo data to generate a position error signal (PES) indicative of the relative distance between the head and the center of the selected track. In turn, the PES is used to generate correction signals which adjust the position of the head by adjusting the amount of current applied to the actuator coil.

During a seek operation, the selected head is moved from an initial track to a destination track on the associated disc surface. A velocity controlled approach is used wherein a velocity profile, indicative of a desired velocity trajectory for the head, is selected based on the distance between the initial and destination tracks. The head is first accelerated to a maximum velocity through the application of a large magnitude of current to the coil. The head then is maintained at this maximum velocity until it reaches a predetermined distance from the destination track, at which point a large amount of current of opposite polarity is applied to the coil to decelerate and settle the head onto the destination track. Adjustments in the velocity of the head are repetitively made during the seek in relation to the difference between the actual velocity and the velocity profile. The desired velocity at any given point during the seek is referred to as a demand velocity, with the velocity profile comprising a series of demand velocity values.

To achieve greater levels of data transfer performance, the heads are typically provided with a magneto-resistive (MR) or similar construction. An MR head incorporates separate write and read elements, with the write element comprising an inductive coil about a core with a write gap and the read element comprising a magneto-resistive material having a changed electrical resistance in the presence of a magnetic fields of a predetermined orientation.

The increased sensitivity of the MR element allows write pulses from the head to be relatively narrow, facilitating higher data transfer rates. However, due to the complexity and minute dimensions of MR heads, it is becoming increasingly difficult to design and manufacture heads that exhibit flawless operation. While manufacturing screening operations attempt to sort flawed heads and remove such from the manufacturing process, some heads nevertheless exhibit intermittent discrepant operation, which is usually manifested as a temporary distortion in the readback signal. Ordinarily, a distorted data readback signal may be corrected with appropriate error correction techniques. However, the servo system, which relies on uncorrected position feedback data from the media, is especially susceptible to this problem. Particularly, if the position feedback signal becomes too distorted during a seek, the servo system cannot determine the position of the head, preventing the head from being correctly settled onto the destination track.

Accordingly, there is a need for improvements in the art to enable disc drives to correct servo signal distortion in an MR head. It is to such improvements that the present invention is directed.

SUMMARY OF THE INVENTION

The present invention is directed to an apparatus and method for compensating for position signal distortion during a disc drive seek.

In accordance with preferred embodiments, a disc drive has first and second data recording surfaces on which tracks are defined, a moveable actuator which supports first and second magneto-resistive heads, and a servo circuit which applies current to an actuator coil to position the heads.

During a seek in which the first head is moved from an initial track to a first destination track, upon loss of transduced servo data from the first data recording surface indicative of radial position of the head, the servo circuit switches from the first head to the second head and applies current to the actuator coil to move the second head to a known radial position with respect to the first destination track while transducing servo data from the second data recording surface. The servo circuit subsequently switches back to the first head and positions the first head over the first destination track in order to carry out desired data transfer operations on the first destination track. By temporarily deselecting the first head, head instability can be resolved by the time that the first head is reselected; in the mean time, the disc drive can continue to operate to bring the first head into alignment with the first destination track.

Preferably, the servo circuit brings the first head to a stop prior to switching to the second head, such as by applying an electrical short to the actuator coil. Moreover, the second head is preferably settled onto a second destination track in the same cylinder as the first destination track so that, when the servo circuit switches back to the first head, the first head is substantially over the first destination track. The second head is preferably the immediately prior head that was utilized before the first head was selected, since this prior head will likely have substantially retained its thermal equilibrium, thus reducing the risk of signal distortion with the second head.

These and various other features and advantages which characterize the present invention will be apparent from a reading of the following detailed description and a review of the associated drawings.

DETAILED DESCRIPTION

Figure 1:
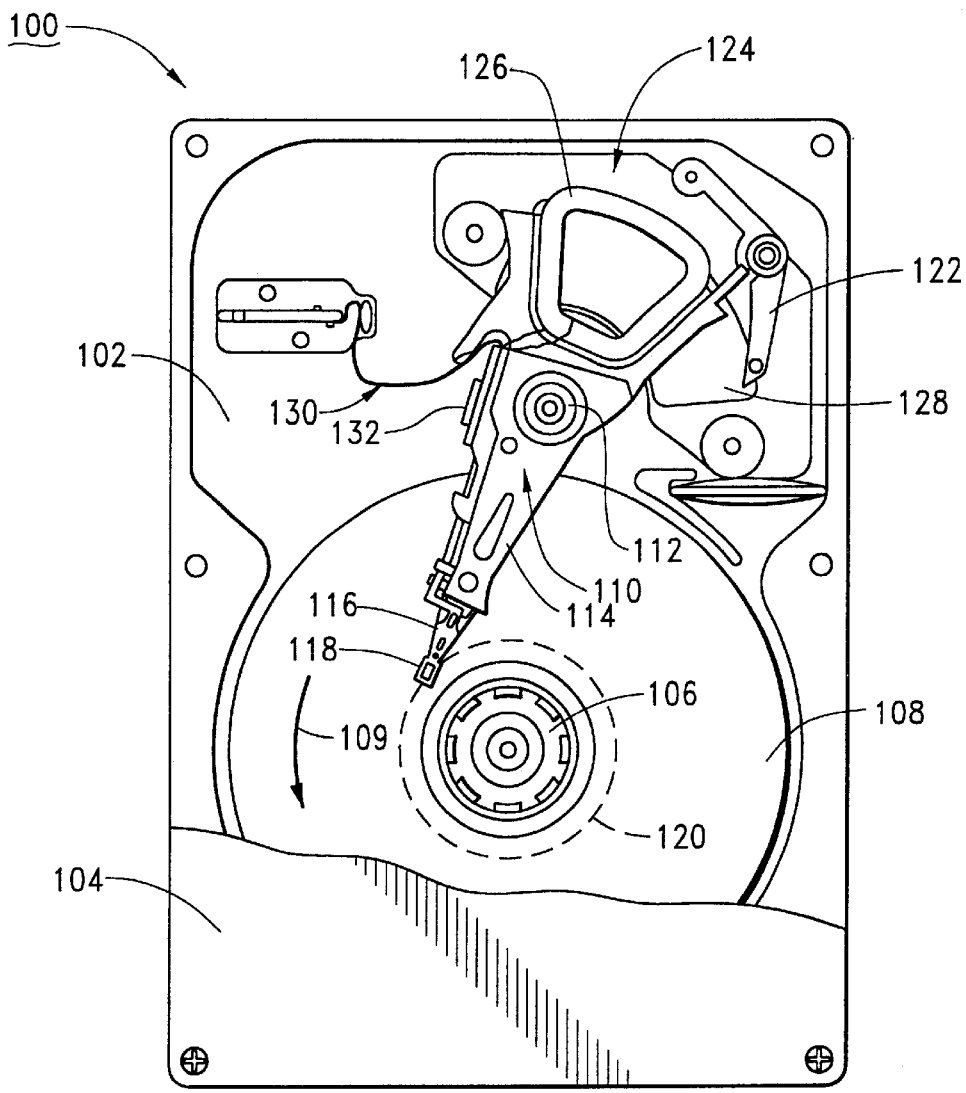
FIG. 1 shows a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads, each with a thin film write element and an MR read element.

When the disc drive 100 is not in use, the MR heads 118 are moved over and come to rest upon landing zones 120 near the inner diameter of the discs 108 and the actuator assembly 110 is secured using a magnetic latch assembly 122.

The radial position of the MR heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The MR heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/ driver circuit 132 (preamp) which applies write currents to the write elements of the MR heads 118 during a write operation and applies read bias currents to the MR read elements of the MR heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
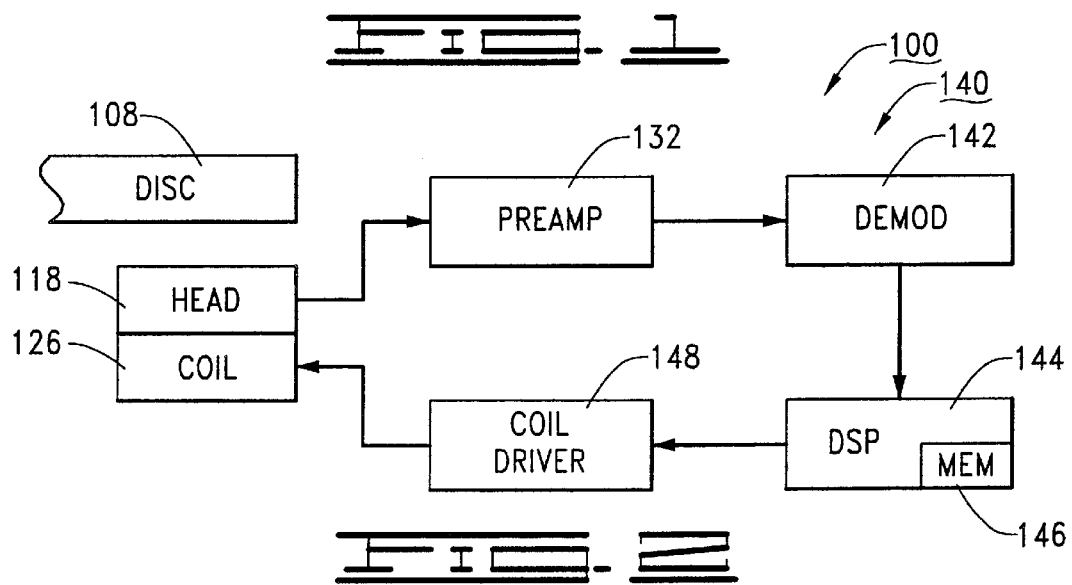
FIG. 2 provides a functional block diagram of a servo circuit of the disc drive of FIG. 1.

FIG. 2 shows a functional block diagram of a servo circuit 140 of the disc drive 100 of FIG. 1 which uses servo data arranged on the discs 108 to control the position of the heads 118. The servo data are transduced by the selected MR head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil.

Figure 3:
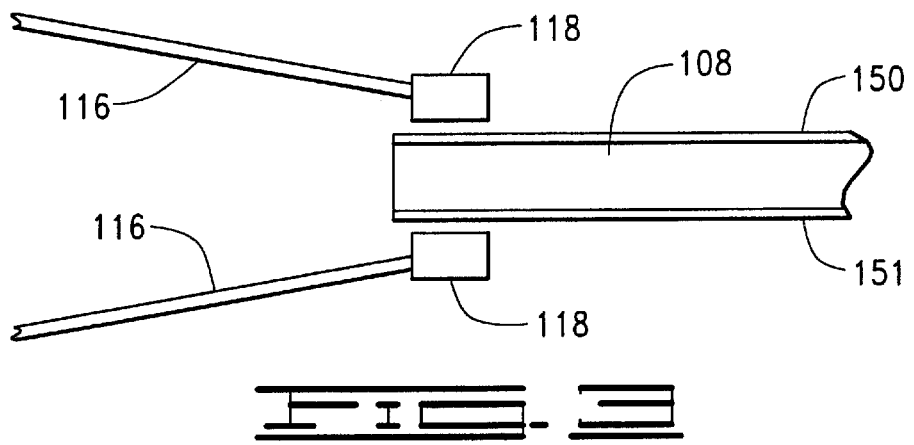
FIG. 3 show the placement of MR heads about adjacent disc recording surfaces in the disc drive of FIG. 1.

FIG. 3 is a graphic portrayal of the orientation of first and second MR heads 118 with respect to adjacent data recording surfaces 150, 151 on opposing sides of a selected disc 108. It will be understood that the first and second MR heads 118 are both affixed to and supported by the actuator assembly 110, so that both heads 118 substantially occupy the same radial position with regard to the data recording surfaces 150, 151. The tracks (not designated in FIG. 3) on each of the data recording surfaces 150, 151 are accordingly radially aligned, with all of the tracks on all data recording surfaces at each given radial position defining a cylinder, as is conventional in the art.

Figure 4:
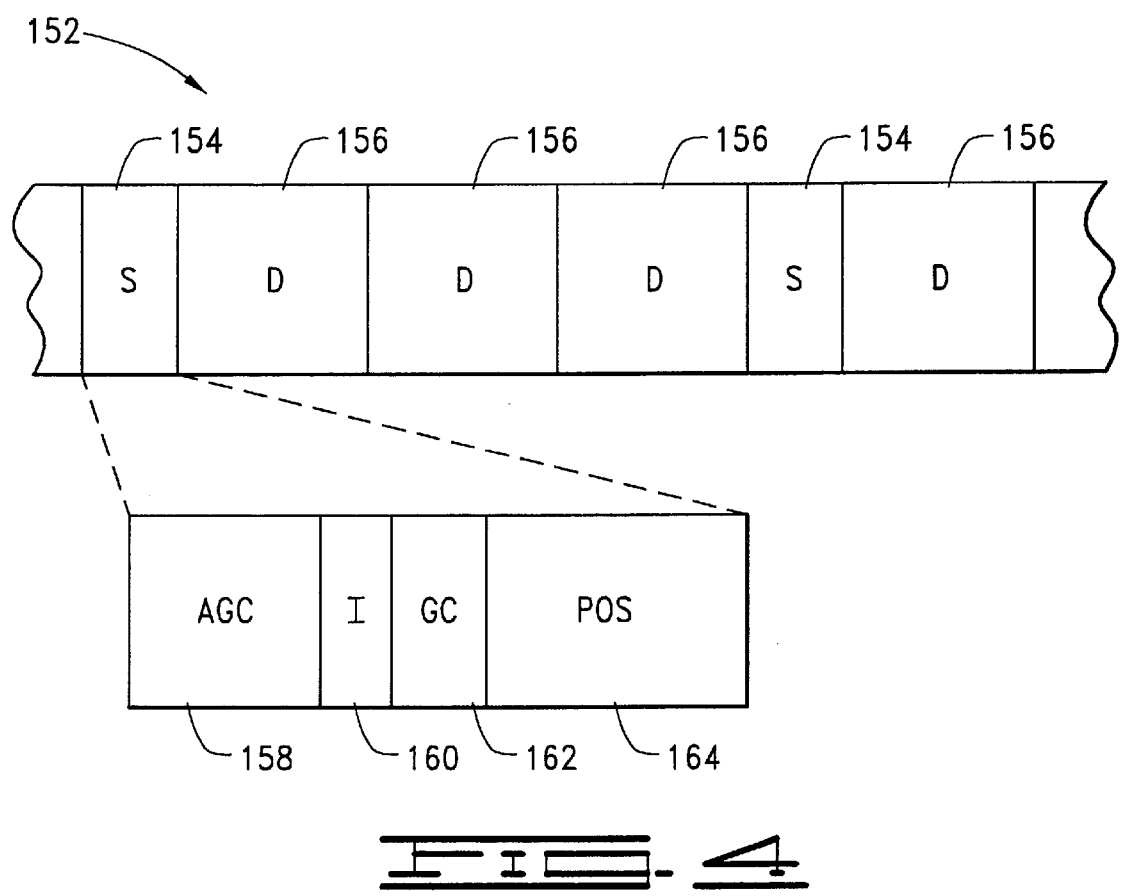
FIG. 4 is a representation of a portion of a track of the disc depicted in FIG. 3 illustrating the respective arrangement of servo data fields and user data fields, as well as a preferred format for the servo data fields.

FIG. 4 shows a portion of a selected track 152 on the data recording surface 150, illustrating the arrangement of respective servo fields 154 and user data fields 156. Each servo field 154 preferably includes an automatic gain control (AGC) field 158, an index field 160, a Gray code (GC) field 162 and a position (POS) field 164. The AGC field 158 provides an oscillating signal that prepares the servo circuit 140 for remaining portions of the servo field 154, the GC field 162 provides a unique track address to indicate radial position for the track, and the POS field 164 provides an arrangement of servo patterns that allows the servo circuit 140 to perform intra-track positioning.

During a seek operation for a selected one of the heads 118, the servo circuit 140 determines the address of the track being followed by the selected head (from the GC field), determines the address of the destination track, and calculates the distance therebetween in terms of tracks to go. Thereafter, the servo circuit 140 initiates a seek to move the selected head 118 from the initial track to the destination track by applying current to the coil 126 to accelerate the head 118 in the appropriate direction. During the seek, the velocity of the head is controlled with respect to position, with the servo data on intermediary tracks being detected to continually determine the position of the head 118. At a selected distance from the destination track, current is applied to the coil 126 of opposite polarity to decelerate the head 118 to come to rest over the destination track in accordance with a deceleration profile which defines the desired deceleration velocity trajectory for the head 118.

Should the readback signal from the selected head 118 become distorted, however, the servo circuit 140 will generally be unable to determine with certainty the position of the head during the seek. In the prior art, typically the only way to resolve such a situation has been to abort and retry the seek a successive number of times until the problem is resolved, or a seek error is declared to the host.

Figure 5:
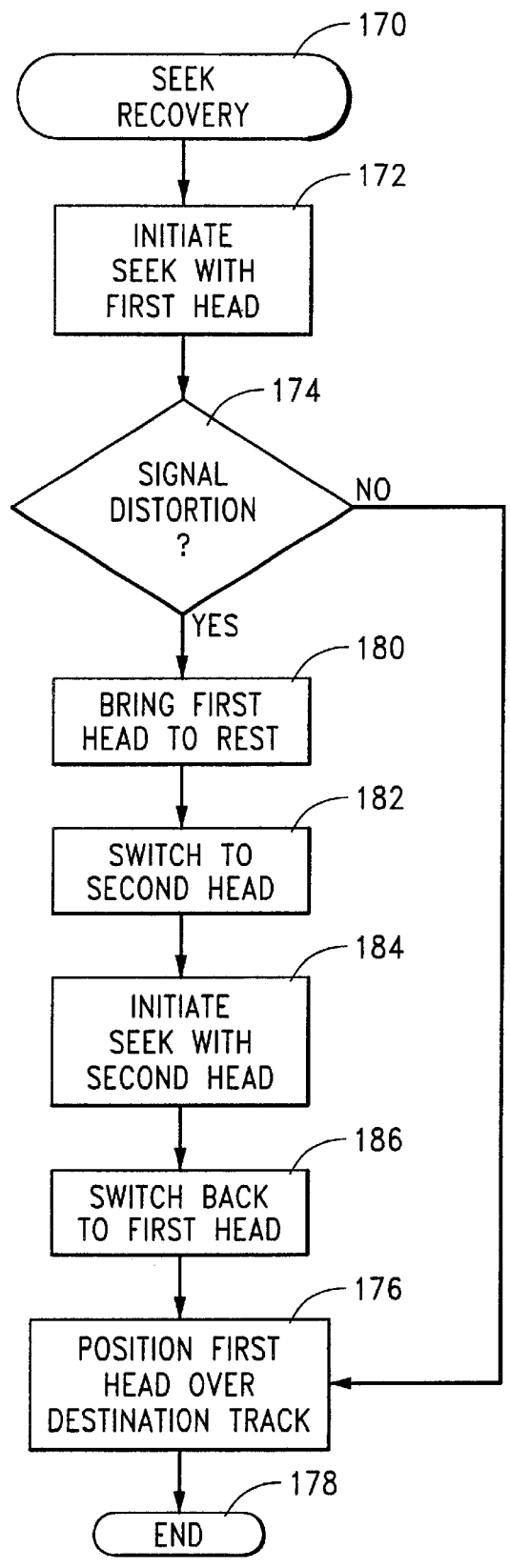
FIG. 5 provides a functional block diagram depicting a SEEK RECOVERY routine as carried out in preferred embodiments of the present invention.

The present invention, however, as embodied herein and claimed below, provides an improved approach to recovering from intermittent position data readback signal distortion during a seek. Particularly, FIG. 5 provides a SEEK RECOVERY routine 170, illustrative of steps carried out in accordance with preferred embodiments of the present invention. It will be understood that the flow of FIG. 5 preferably represents programming stored in DSP memory 146 and utilized by the DSP 144 during a seek.

At step 172, the servo circuit 140 initiates a seek with a selected head 118 (referred to herein as the first head) to a destination track, generally in accordance with the foregoing discussion. Decision step 174 inquires whether distortion in the position readback signal arises during the seek. Thus, if the servo circuit 140 is able to properly decode the position information from the servo data during the seek, then it will be understood that the flow passes to step 176 wherein the head 118 is settled onto the destination track, after which the disc drive 100 proceeds to carry out the desired data transfer operation thereon (and the routine ends at 178).

The foregoing sequence represents the typical operation of the disc drive 100, as signal distortion is contemplated as generally occurring only on an intermittent and infrequent basis for marginal heads. If the distortion is related to temperature, it is contemplated that the distortion may have a greater probability of arising when the first head 118 is initially selected; that is, prior to the seek operation of step 172, a different head 118 adjacent a different data recording surface was biased by the preamplifier and a head switch operation was carried out to switch from this prior head to the first head.

At such time that readback signal distortion does arise during the seek initiated at step 172 sufficient to prevent the servo circuit 140 from decoding the servo data, the routine passes from decision step 174 to step 180 wherein the first head is immediately brought to rest. This is preferably carried out by applying a temporary electrical short across the actuator coil 126. The purpose of bringing the head 118 to rest is precautionary in nature, to prevent the inadvertent slamming of the actuator 110 against an inner or outer limit stop at a terminal velocity sufficient to damage the heads 118 (since the position of the first head 118 is unknown). The servo circuit 140 next switches to a different (second) head 118 at step 182. This second head can be any of the remaining heads in the disc drive 100. In one preferred embodiment, the second head 118 is adjacent the first head (such as illustrated in FIG. 3), although alternatively, the second head 118 can be a designated head 118 that has demonstrated the least amount of signal distortion (and accordingly, will more likely provide undistorted operation). In another preferred embodiment, the second head 118 is the most recently utilized head prior to the operation of step 172, and thus may have a greater chance of having substantially maintained thermal equilibrium since its most recent use.

The switching to the second head 118 results in the removal of the read bias current from the first head for a short period of time, which has been found to typically resolve the unstable operation of the first head when the first head is subsequently selected. Accordingly, once the second head is selected, the routine continues to step 184 where the servo circuit 140 initiates a seek with the second head 118 to a second destination track on the associated data recording surface that resides in the same cylinder as the first destination track. After the second destination track is reached, the servo circuit 140 switches back to the first head at step 186 and the flow continues at step 176 where the first head is positioned over the first destination track and the routine ends at 178.

Although the foregoing routine preferably performs a seek with the second head 118 to the same cylinder as the first destination track, such is not necessarily required, so long as the seek with the second head (step 184) serves to place the first head 118 in a known relation to the first destination track. Moreover, although head instability has been described as the cause for the distortion detected at decision step 174, it will be understood that the routine will perform equally well in situations where the position of the first head cannot be adequately detected due to errors in the servo data, the presence of localized thermal asperities on the data recording surface, etc.

In summary, it will now be recognized that the present invention is directed to an apparatus and method for compensating for position signal distortion during a disc drive seek.

In accordance with preferred embodiments, a disc drive 100 has first and second data recording surfaces 150, 151 on which tracks 152 are defined, a moveable actuator 110 which supports first and second magneto-resistive heads 118, and a servo circuit 140 which applies current to an actuator coil 126 to position the heads.

During a seek in which the first head is moved from an initial track to a first destination track (step 172), upon loss of transduced servo data from the first data recording surface indicative of radial position of the head (step 174), the servo circuit switches from the first head to the second head (step 182) and applies current to the actuator coil to move the second head to a known radial position with respect to the first destination track while transducing servo data from the second data recording surface (step 184). The servo circuit subsequently switches back to the first head (step 186) and positions the first head over the first destination track (step 176) in order to carry out desired data transfer operations on the first destination track.

Preferably, the servo circuit brings the first head to a stop prior to switching to the second head (step 180), such as by applying an electrical short to the actuator coil. Moreover, the second head is preferably settled onto a second destination track in the same cylinder as the first destination track so that, when the servo circuit switches back to the first head, the first head is substantially over the first destination track.

For purposes of the appended claims, the phrase "magneto-resistive head" will be understood to describe any of a variety of heads that use separate read and write elements and transduce data from a data recording surface by applying a read bias current to the read element. Hence, the phrase "magneto-resistive head" includes MR heads, giant magneto-resistive (GMR) heads, spin-valve heads, and other, similar technologies.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention and as defined in the appended claims.

What is claimed is:

1. In a disc drive having a plurality of axially aligned rotatable data recording surfaces on which nominally concentric tracks are defined and accessed by respective read/write magneto-resistive heads supported by a common, moveable actuator, a method for carrying out a seek wherein a first head is moved from an initial track to a first destination track on a first data recording surface, comprising steps of:

(a) applying a read bias current to the first head to transduce servo data on the first recording surface to detect radial position of the first head as the first head is moved across the first recording surface;

(b) decelerating the first head to rest when the first head unsuccessfully transduces the servo data sufficiently to determine the radial position of the first head;

(c) switching from the first head to a second head and applying a read bias current to the second head to transduce servo data on a second recording surface to detect radial position of the second head as the second head is moved across the second recording surface;

(d) switching from the second head to the first head when the second head is positioned at a known radial relation to the first destination track on the first recording surface; and (e) positioning the first head over the first destination track on the first recording surface.

2. The method of claim 1, wherein the decelerating step (b) comprises applying an electrical short across an actuator coil used to move the first and second heads across the respective first and second data recording surfaces.

3. The method of claim 1, wherein the tracks on the plurality of axially aligned rotatable data recording surfaces at common radial positions define cylinders, and wherein the switching step (d) comprises switching from the second head to the first head when the second head is disposed over a second destination track on the second data recording surface, the first and second destination tracks disposed in the same cylinder.

4. The method of claim 1, further comprising prior steps of applying a read bias current to the second head and switching from the second head to the first head.

5. A disc drive, comprising:

first and second axially aligned rotatable data recording surfaces on which tracks are defined;

an actuator which supports a coil adjacent a magnetic circuit of an actuator motor, and first and second read/write magneto-resistive heads adjacent the respective first and second data recording surfaces; and a servo circuit which carries out a seek to move the first head from an initial track to a first destination track on the first data recording surface by applying current to the actuator coil while detecting position of the first head by transducing servo data from the first data recording surface wherein, upon loss of the transduced servo data from the first data recording surface, the servo circuit brings the first head to rest, switches from the first head to the second head and applies current to the actuator coil to move the second head to a known radial position with respect to the first destination track while transducing servo data from the second data recording surface, and subsequently switches back to the first head to position the first head over the first destination track.

6. The disc drive of claim 5, wherein the tracks at each common radial position on the first and second data recording surfaces define a cylinder, wherein the known radial position comprises a second destination track on the second data recording surface, and wherein the first and second destination tracks define a common cylinder.

7. The disc drive of claim 5, wherein the servo circuit brings the first head to rest by applying an electrical short across the actuator coil.

8. A disc drive, comprising:

first and second magneto-resistive heads adjacent first and second axially aligned rotatable data recording surfaces; and compensation means for compensating for distortion in a readback signal obtained as the first head transduces servo data on the first data recording surface during a seek wherein the first head is moved from an initial track to a destination track on the first data recording surface, including means for bringing the first head to rest and switching to the second head during the seek in response to said distortion.

9. A method for performing a seek operation to move a first head from an initial track to a destination track on a first recording surface, comprising:

transducing servo position data from intermediary tracks between the initial track and the destination track as the first head sweeps across the first recording surface;

bringing the first head to rest when an error condition prevents the first head from transducing the servo position data from a selected intermediary track;

switching to a second head adjacent a second recording surface;

subsequently transducing servo data from tracks on the second recording surface to place the second head at a desired location with respect to the destination track on the first recording surface; and switching back to the first head.

10. The method of claim 9, wherein the first and second heads comprise magneto-resistive read elements and wherein the respective transducing steps comprise biasing the respective magneto-resistive read elements.

11. The method of claim 3 performed in a disc drive further comprising at least a third head adjacent a third recording surface, and wherein the switching step further comprises selecting the second head as the head most recently used to transduce data.

12. The method of claim 9, wherein the first and second heads are moved through application of current to an actuator coil and wherein the bringing step comprises applying an electrical short across said coil.

13. The method of claim 9, wherein the desired location of the subsequently transducing step is selected so that the first head is nominally disposed adjacent the destination track on the first recording surface upon operation of the switching back step.

* * * * *